US010238094B2

(12) United States Patent
Forbes

(10) Patent No.: US 10,238,094 B2
(45) Date of Patent: Mar. 26, 2019

(54) METHOD AND ASSEMBLY FOR KNOTTING AND SPLICING A LINE

(71) Applicant: Matthew A. Forbes, La Jolla, CA (US)

(72) Inventor: Matthew A. Forbes, La Jolla, CA (US)

( * ) Notice: Subject to any disclaimer, the term of this patent is extended or adjusted under 35 U.S.C. 154(b) by 116 days.

(21) Appl. No.: 15/458,431

(22) Filed: Mar. 14, 2017

(65) Prior Publication Data

US 2017/0290314 A1    Oct. 12, 2017

Related U.S. Application Data

(60) Provisional application No. 62/320,735, filed on Apr. 11, 2016.

(51) Int. Cl.
*A01K 91/04* (2006.01)
*A01K 91/047* (2006.01)

(52) U.S. Cl.
CPC ............ *A01K 91/04* (2013.01); *A01K 91/047* (2013.01)

(58) Field of Classification Search
CPC ...... A01K 91/047; A01K 91/04; B65H 69/00; B65H 69/04
USPC ..................... 289/1.5, 17; 140/101, 123, 149
See application file for complete search history.

(56) References Cited

U.S. PATENT DOCUMENTS

| 2,117,322 | A | * | 5/1938 | Hillman | A01K 91/00 |
| | | | | | 267/69 |
| 2,760,127 | A | * | 8/1956 | Duncan | H01G 5/38 |
| | | | | | 310/DIG. 6 |
| 2,865,978 | A | * | 12/1958 | Modrey | H01B 7/06 |
| | | | | | 138/126 |
| 3,131,957 | A | * | 5/1964 | Musto | A01K 91/04 |
| | | | | | 289/17 |
| 3,273,330 | A | * | 9/1966 | Gonsalves | B65H 69/04 |
| | | | | | 57/22 |
| 4,400,025 | A | * | 8/1983 | Dennison | A01K 91/047 |
| | | | | | 289/17 |
| 4,403,797 | A | | 9/1983 | Ragland, Jr. | |
| 4,421,145 | A | * | 12/1983 | Broberg, Jr. | B21F 1/002 |
| | | | | | 140/104 |
| 4,871,200 | A | | 10/1989 | Ryder et al. | |
| 5,240,295 | A | * | 8/1993 | Spencer | B65H 69/04 |
| | | | | | 289/1.5 |
| 5,566,435 | A | * | 10/1996 | Brown, Jr. | A61F 13/2051 |
| | | | | | 100/2 |
| 5,685,037 | A | | 11/1997 | Fitzner et al. | |

(Continued)

*Primary Examiner* — Shaun R Hurley
*Assistant Examiner* — Bao-Thieu L Nguyen
(74) *Attorney, Agent, or Firm* — Vincent G. LoTempio; Kloss, Stenger & LoTempio; David T. Staphenson

(57) ABSTRACT

A method and assembly for knotting a line restrains a fishing line in a loose knot pattern while a knot or splice is formed in the fishing line to enable tightening the knot by stretching the line. The assembly includes a pair of cylinders having an external surface, a first end, and a second end. A pair of tubes encapsulate the pair of cylinders to provide a slip resistant surface. Two pair of caps comprising an open end and a closed end detachably attach to the first and second ends of the tubes. The caps include at least one flat surface region having a depression. One cap per tube includes a light emitting diode (LED) which enables hands free illumination while knotting or splicing line. Magnets are integrated into the cap depressions to enable magnetic attraction between tubes. Fishing line wrap around the tubes to enable knotting and splicing.

22 Claims, 12 Drawing Sheets

(56) References Cited

U.S. PATENT DOCUMENTS

| | | | |
|---|---|---|---|
| 5,690,369 A | 11/1997 | Steck, III | |
| 5,690,370 A * | 11/1997 | Steck, III | A01K 91/047 289/17 |
| 6,322,112 B1 | 11/2001 | Duncan | |
| 6,817,634 B2 | 11/2004 | Champion | |
| 7,270,672 B1 | 9/2007 | Singer | |
| 8,936,282 B1 * | 1/2015 | Berdahl | B65H 69/04 289/17 |
| 9,635,847 B1 * | 5/2017 | Chaney | A01K 97/26 |
| 2005/0022441 A1 * | 2/2005 | Blette | A01K 91/047 43/43.1 |
| 2006/0130389 A1 * | 6/2006 | Annelin | A01K 91/047 43/44.98 |
| 2006/0185221 A1 * | 8/2006 | Burns | A01K 83/00 43/44.83 |
| 2008/0279588 A1 * | 11/2008 | Narita | G03G 15/0216 399/168 |
| 2009/0142132 A1 * | 6/2009 | Klein | A01K 91/047 403/301 |
| 2011/0154716 A1 * | 6/2011 | Turner | A01K 91/04 43/43.13 |
| 2015/0264908 A1 * | 9/2015 | Banda | A01K 91/047 289/1.5 |
| 2015/0268016 A1 * | 9/2015 | Eshetu | F42B 8/00 434/11 |
| 2017/0290314 A1 * | 10/2017 | Forbes | A01K 91/047 |
| 2018/0132466 A1 * | 5/2018 | Walters | A01K 91/04 |

* cited by examiner

136

| Model Descriptions | | First Tube Type | | Cap Type for First Tube | | Second Tube Type | | Cap Type for Second Tube | |
|---|---|---|---|---|---|---|---|---|---|
| Model Type | Refer To Figure | Plain | Aperture in Middle | Flat End | Hole in End for LED | Plain | Aperture in Middle | Flat End | Hole in End for LED |
| A | Fig. 5A | X | | X | | X | | X | |
| B | Fig. 7 | X | | X | | X | | | X |
| C | Fig. 6 | X | | X | | | X | X | |
| D | Fig. 1 Fig. 2 | X | | | X | | X | X | |

| Test Runs | Cinched with Knot Pullers | Cinched with Bare Hands |
|---|---|---|
| 140 Trial 1 | 33.6 lbs | 24.8 lbs |
| 142 Trial 2 | 30.1 lbs | 28.5 lbs |
| 144 Trial 3 | 29.9 lbs | 27.0 lbs |
| 146 Trial 4 | 29.5 lbs | 25.0 lbs |
| Average | 30.8 lbs | 26.3 lbs |

FIG. 12

METHOD AND ASSEMBLY FOR KNOTTING AND SPLICING A LINE

CROSS REFERENCE OF RELATED APPLICATIONS

This application claims the benefits of U.S. provisional application No. 62/320,735, filed Apr. 11, 2016 and entitled HAND HELD FISHING LINE TYING DEVICE which provisional application is incorporated by reference herein in its entirety.

FIELD OF THE INVENTION

The present invention relates generally to a method and assembly for knotting and splicing a line. More so, the present invention relates to a method and assembly for knotting and splicing a fishing line in a loose knotted pattern while a knot or splice is formed in the line, and then tightens the knot by stretching the line with a pair of cylinders and a pair of tubes that encapsulate the cylinders; whereby two pair of caps on the cylinders include an illumination button which engages a light emitting diode (LED) to illuminate the knotting and splicing process; whereby at least one flat surface region on the caps inhibits rolling by the tubes; and whereby magnets integrated into the caps enable the pair of tubes to be magnetically attracted for stowage.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a fishing line is a synthetic cord specially designed for angling. Fishing lines are often constructed of nylon (monofilament), polyvinylidene fluoride (fluorocarbon), wire, and polyethylene terephthalate DACRON® and ultra-high molecular weight polyethylene SPECTRA® and DYNEEMA®, which may be braided or fused), though many modern fishing lines are made from nylon or silk.

In the current environment of diverse fishing reels, having varying drag ratings, line capacity and gear ratios, and high-strength but lightweight composite rods, anglers are increasingly required to consistently and safely secure and tighten the highest strength connection possible between the varying types of lines available, or between a line and a hook(s), or other types of terminal tackle.

It is known in the art that important parameters of a fishing line are length, material, and weight, whereby thicker lines are more visible to fish. Factors that may determine what line an angler chooses for a given fishing environment include breaking strength, knot strength, ultraviolet radiation resistance, castability, limpness, stretch, abrasion resistance, and visibility. These variations are determined based on the type of fish the line is designed to catch.

The fishing line enables knots to be tied and splices to be formed at various points along the line. It is known that an angler may utilize these knots and splices to secure hooks, swivels, leaders, or lures, to a fishing line and that the proper formation of such knots and splices is critical to their strength and for fishing success. Unfortunately, tying a fishing line knot to a fishing attachment can be a tedious task. The problem is often aggravated by cold weather when the fingers and hands are numb or if the fisherman is afflicted with arthritis, which makes manipulating the line more difficult. Often, securing and tightening connections between one line and another to form a splice, knot or other type of connection, is done using bare hands. However, the process of doing this can result in a weak splice or knot, is often uncomfortable, in many cases painful, and done at risk of personal injury as line can easily cut through skin.

In addition, securing connections between a fishing line and terminal tackle, such as a hook, requires that a knot or splice be formed by pulling on the line by hand. Further, a known fishing line connection can be formed by tying a knot, especially at the line connection to the hook eye, where violent jolts occur as the fish struggles to free itself. Also, the connection to the hook eye is a key connecting point of fish and fisherman.

However, tying and securing fishing knots by hand can come with problems such as discomfort, pain and potential for personal injury because great forces are exerted on the line, and in turn one's hands, during the process of creating a splice, knot or other types of connections. And, in instances where an object is not available to hold a hook, a person may use a hand to hold the hook as the line is secured to it, which puts a person at obvious risk of injury.

Given that hand-tied fishing knots can result in weak connections, discomfort, pain and risk of personal injury to one's hands, there exists a need to more comfortably and safely tie high strength connections between a line and a second line, and between the line and a hook, or other types of terminal tackle. There also exists a need to provide a pair of tubes and cylinders that hold the line so that it does not slip while the knot or splice is being tied.

Other proposals have involved knot and splice forming devices. The problem with these tying devices is that they do not provide a slip resistant surface to tie the ends of the line around while forming a knot pattern and subsequently pulling the line in opposite directions. Other problems with these tying devices is that they are often designed to tie a single type of knot and do not have the capability to assist in the creation of a wide variety of knots, especially those types of knots that essentially require the use of one's hand, in addition to the strong pulling forces that must be exerted on one or more lines to secure a knot. Also, the crimping and splicing means are not easily accessible. Even though the above cited knot and splice forming devices meet some of the needs of the market, a method and assembly for knotting a line by restraining a fishing line in a loose knot pattern while a knot or splice is formed in the fishing line by stretching the line until the knot is tightened, and ensuring injury to one's hands does not occur and that the resulting knot is strong, is still desired.

SUMMARY

Illustrative embodiments of the disclosure are generally directed to a method and assembly for knotting a line. The assembly is effective for restraining a fishing line in a loose knot pattern while a knot or splice is formed in the fishing line, and then tightening the knot by stretching the line.

The assembly includes a pair of cylinders having a first end, a second end, and a cylinder sidewall. A pair of slip resistant tubes encapsulate the pair of cylinders. The tubes include a tube sidewall that forms an external surface and an elongated tube cavity. The tubes at least partially encapsulate the cylinders. The external surface of the tubes inhibits slippage. In this manner, the tubes provide a large, slip resistant surface area to hold a line for tying a knot or completing a splice. Two pair of caps comprising an open end and a closed end detachably attach to the first end and the second end of the pair of cylinders. The caps include at least one flat surface region having a depression.

The assembly may also include at least one illumination button which engages a light emitting diode (LED) to enable hands free illumination, while knotting or splicing the line. In yet another embodiment, at least one magnet is integrated into a depression on the at least one flat surface region of each cap. The magnet enables the caps to be magnetically attracted to each other for efficient storage when the assembly is not in use.

In some embodiments, a line having a left strand and a right strand wraps around tubes, or hooks through at least one aperture that forms in tubes. Further, a pair of clamps, or mounting surface may be used to hold either strand of line in conjunction with a tube for knotting and splicing operations. In this manner, a line can be secured to the tubes while being manipulated, stretched, and displaced by the tubes.

In operation, once the line or hook have been secured to the respective tube, or a clamp, the line is stretched taut. From this tensioned position, a knot or splice is loosely formed. The tubes may then be manually pulled apart to tighten the formed knot or splice. Specifically, a left strand and a right strand of the line are held in a loose knot pattern by the tubes or the clamps, or both, so that a knot may be formed in the line by capture and exchange with the left strand and the right strand. The tube(s) is then pulled away from the knot to create a taut line that tightens the knot.

In some embodiments, an assembly for knotting and splicing a line comprises:
a pair of cylinders defined by a first end, a second end, and a cylinder sidewall;
a pair of tubes defined by a tube sidewall that forms an external surface and an elongated tube cavity, the pair of tubes disposed to at least partially encapsulate the pair of cylinders, the external surface of the pair of tubes configured to inhibit slippage;
at least one aperture formed in the cylinder sidewall and the tube sidewall;
two pair of caps comprise an open end and a closed end are configured to detachably attach to the first end and the second end of the pair of tubes;
at least one illumination button disposed to join with the at least one cap, at least one light emitting diode (LED) configured to selectively emit light; and
at least one magnet detachably attached to at least one cap, at least one magnet configured to enable magnetic attraction between the pair of tubes,
whereby the pair of tubes are configured to be manipulated independently of each other during knotting or splicing operations,
whereby the pair of tubes are configured to magnetically engage each other during stowage.

In one aspect, the pair of cylinders may be hollow or solid.

In one aspect, the pair of tubes are generally elongated and hollow.

In another aspect, the external surface of the pair of tubes comprises at least one layer of a polymer material.

In another aspect, at least one aperture has a round shape.

In another aspect, the two pair of caps comprise an inner cap surface configured to receive the first end and the second end of the pair of cylinders.

In another aspect, the two pair of caps comprise at least one flat surface region defined by a depression.

In another aspect, the at least one magnet is housed in the depression.

In another aspect, the at least one cap integrates a light emitting diode (LED).

In another aspect, the assembly comprises a line defined by a left strand and a right strand.

In another aspect, each strand of the line wraps around a respective tube.

In another aspect, each strand of a line is secured by a pair of clamps.

In another aspect, the assembly further comprises a crimp tool configured to form a crimp in the line.

In another aspect, the assembly further comprises a hook configured to detachably attach to the at least one aperture, the hook joins with the left strand or the right strand of the line.

In another aspect, the line forms a splice.

In another aspect, the line joins with a mounting surface and the right strand of the line joins with one of the tubes.

In another aspect, the line is a fishing line.

One objective of the present invention is to provide a hand-held two-piece assembly used to safely, and comfortably, secure high-strength connections by pulling between one line and other line to form a knot, a splice connection, a crimp connection, or between a line and a hook, or other type of terminal tackle, then would otherwise be possible by making such connections using bare hands.

Another objective is to relieve the hands from the pain normally experienced when cinching down on knots, especially with using braided or SPECTRA® lines. Further, the assembly 100 allows the user to pull harder and tighter when cinching down on knots, potentially allowing for a more fully-formed, complete, and ideal knot.

Another objective is to create stronger knots than those tied by hand, to demonstrate that the assembly can help to create stronger knots in addition to making it easier and safer to create knots.

Another objective is to provide a non-slip surface that restricts slippage by a hand or a line.

Yet another objective is to provide apertures in the cylinders and tubes for attaching a hook thereto.

Yet another objective is to restrict rolling of the tube through at least one flat surface region on each cap.

Yet another objective is to provide hands-free illumination from the caps at the ends of the tubes while knotting or splicing the line.

Yet another objective is to provide magnetic attractive forces to magnetically join the tubes during stowage.

Yet another objective is to house the magnets in at least one of the at least one flat surface regions to enhance the magnetic attraction.

Yet another objective is to provide an inexpensive to manufacture assembly for knotting and splicing a fishing line.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 11 is a table of exemplary tube and cap configurations, in accordance with an embodiment of the present invention.

FIG. 12 is a table showing experimental breaking strength analysis of eight 3-turn Seaguar knots formed with 30 lb Izorline XXX Monofilament and 30 lb Seaguar Blue Label Fluorocarbon using the assembly versus bare hands to cinch the knot.

Like reference numerals refer to like parts throughout the various views of the drawings.

DETAILED DESCRIPTION OF THE INVENTION

Figure 1:
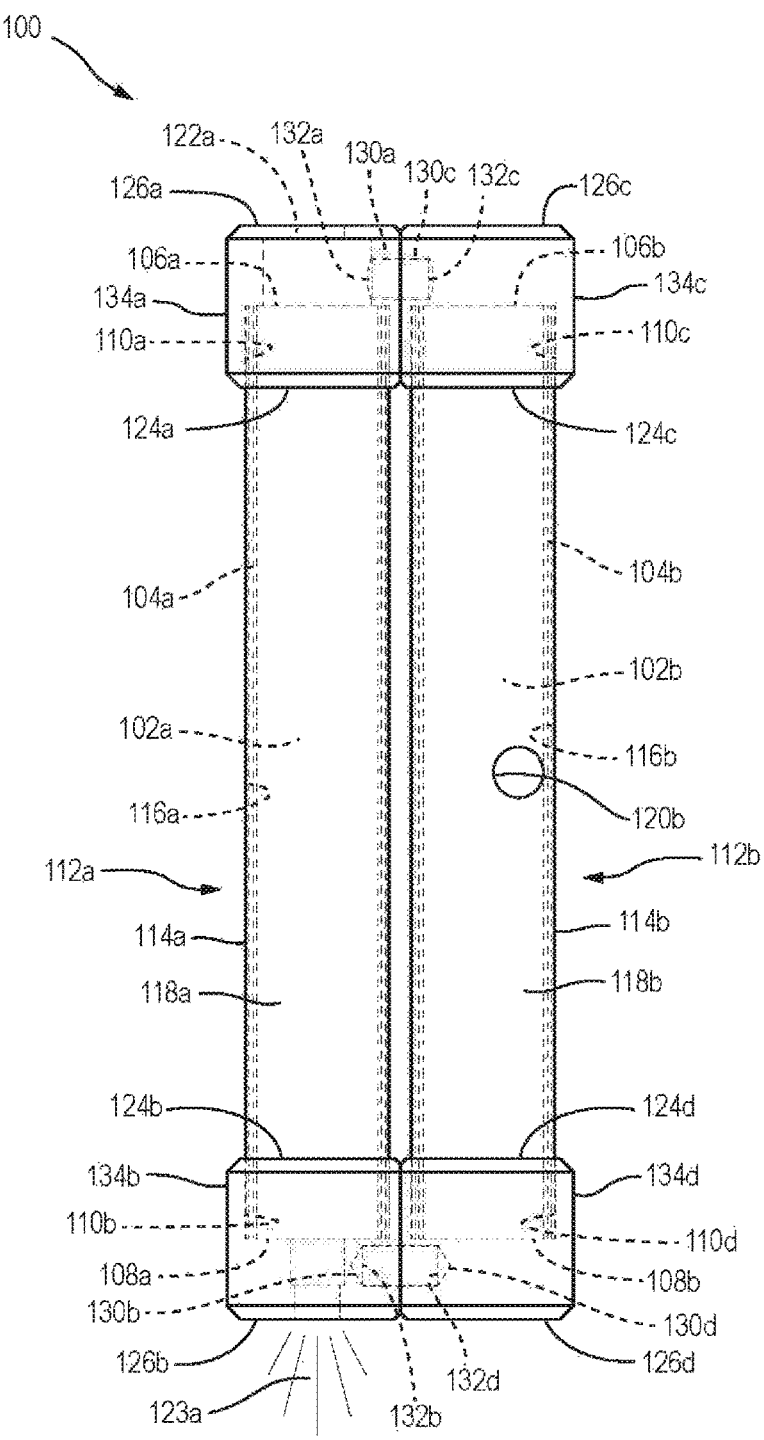
FIG. 1 illustrates a side view of an assembly magnetically attracted at the caps, where the assembly is listed as Model Type D in FIG. 11, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. As used herein, the word "assembly" with reference 100 means a hand-held two-piece assembly. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A method 201 and assembly 100 for knotting a line is referenced in FIGS. 1-11. Assembly 100 restrains a line 200 in a loose knot pattern while a knot 206 or splice 208 is formed in the line 200 by pulling ends of line 200 in opposite directions, and thereby tightening the knot 206.

In FIG. 1, assembly 100 includes a pair of cylinders 102a, 102b having first ends 106a, 106b, second ends 108a, 108b, and cylinder sidewalls 104a, 104b. A pair of slip resistant tubes 112a, 112b encapsulate cylinders 102a, 102b. Tubes 112a, 112b include tube sidewalls 114a, 114b that forms external surfaces 118a, 118b with elongated tube cavities 116a, 116b. External surfaces 118a, 118b of tubes 112a, 112b are configured to inhibit slippage by line 200 that wraps around tubes 112a, 112b, or a hand that grips tubes 112a, 112b. In this manner, tubes 112a, 112b provide a large, slip resistant surface area to hold line 200 for tying a knot 206 and forming a splice 208.

Two pair of caps 134a-d, having inner cap surfaces 110a-d, fasten onto open ends 124a-d, and closed ends 126a-d, to detachably attach to first ends 106a, 106b and second ends 108a, 108b of cylinders 102a, 102b. Caps 134a-d include at least one flat surface region 128a-d (FIG. 2), defined by depressions 130a-d. At least one illumination button 122a is integrated into cap 134a. Illumination button 122a selectively engages a light emitting diode (LED) 123a to enable hands free illumination while knotting or splicing the line 200. Depressions 130a-d, integrate magnets 132a-d to enable magnetic attraction between tubes 112a, 112b for stowage of assembly 100. Aperture 120b permits passage of a hook 216 through tube 112b and cylinder 102b.

As referenced in FIG. 1, assembly 100 includes a pair of cylinders 102a, 102b having first ends 106a, 106b, second ends 108a, 108b, with cylinder sidewalls 104a, 104b. Cylinders are generally elongated, cylindrical in shape, and hollow. In some embodiments, a cylinder may be solid, like a rod. In instances where a cylinder is a solid rod, the outside diameter is about 0.3" to 1.1". In some embodiments, a cylinder 102a, 102b may be fabricated from a rigid polymer, wood, and fiberglass, or other suitable material, but most preferably from a metal.

Figure 2:
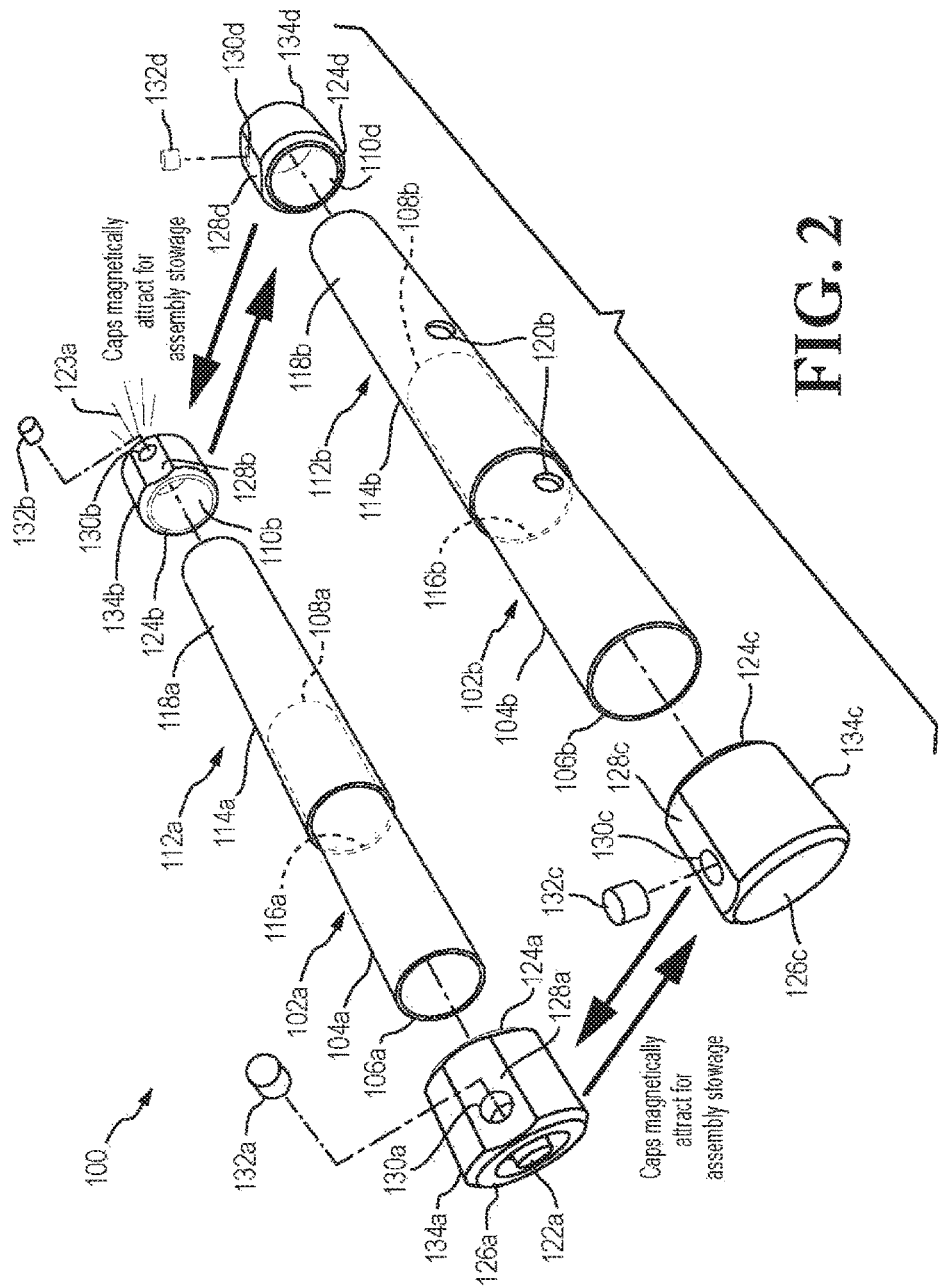
FIG. 2 illustrates an exploded perspective view of a disassembled assembly for knotting and splicing a line shown in FIG. 1, in accordance with an embodiment of the present invention.

Turning now to FIG. 2, a pair of tubes 112a, 112b at least partially encapsulate cylinders 102a, 102b. Tubes 112a, 112b may include multiple layers of polymers that wrap around cylinders 102a, 102b. Though in other embodiments, tube 112a, 112b is a single component that cylinder 102, 102b slides in and out of Tubes 112a, 112b have a diameter generally equal to or larger than cylinders 102a, 102b to enable encapsulation thereof.

In some embodiments, tubes 112a, 112b are defined by tube sidewalls 114a, 114b that forms external surfaces 118a, 118b. Tube sidewalls 114a, 114b forms elongated tube cavities 116a, 116b. External surfaces 118a, 118b of tubes 112a, 112b is configured to inhibit slippage. In one embodiment, external surfaces 118a, 118b may include at least one layer of a polymer material that forms a secure grip for line 200 wrapping around tubes 112a, 112b, and hand forming a grip.

In one exemplary use, the generally cylindrical tubes 112a, 112b are sufficiently long to allow a human hand to grip comfortably, while also encapsulating cylinders 102a, 102b. In one embodiment, tubes 112a, 112b measure about 3" to 7" long. In another embodiment, the inside diameter and wall thickness of tubes 112a, 112b and cylinders 102a, 102b may be about 0.3" to 1.1" and 0.01" to 0.2", respectively.

The non-slip polymer material that makes up tubes 112a, 112b may be effective for restricting slippage of line 200 that is wrapped around tubes 112a, 112b. Essentially, the slip resistant external surfaces 118a, 118b of tubes 112a, 112b provide a large, slip resistant surface area to grip cylinders 102a, 102b and manipulate line 200 that is stretched between tubes 112a, 112b. External surfaces 118a, 118b may include multiple layers of a polymer material, polyolefin, nylon, or other type of plastic that shrinks upon heating.

In other embodiments, tubes 112a, 112b may be made of ethylene propylene diene monomer (EPDM), polychloroprene (Neoprene) or other type of rubber tubing having a Shore hardness of approximately 40 A to 70 A that, like polyolefin, nylon or other type of plastic that shrinks upon heating, provides a large, slip-resistant surface area to grip cylinders 102a, 102b. Tubes 112a, 112b are configured to provide a comfortable surface for a human hand to grasp, while also being difficult to cut through by the force exerted by line 200 pressing into it.

In some embodiments, tubes 112a, 112b construction is from a plastic that shrinks upon heating. In this instance, tubes 112a, 112b shrink in place over cylinders 102a, 102b by heating tubes 112a, 112b. This results in a tight contact between the inside surface area of tubes 112a, 112b, which should have a thickness of no less than 0.01", and the outside surface area of cylinders 102a, 102b.

In some embodiments, tubes 112a, 112b constructed of rubber tubing. In other embodiments, tubes 112a, 112b can be formed by coating cylinders 102a, 102b with a liquid rubber that can solidify. In this instance, tubes 112a, 112b may have an inside diameter approximately equal to the outside diameter of cylinders 102a, 102b so they fit together, and are held to each other by forces of friction. In yet another embodiment, cylinders 102a, 102b may be layered with more than one, but typically not more than four tubes; either of the same or different material of construction.

In one embodiment, at least one aperture 120b is formed. In one exemplary use, aperture 120b forms in cylinder sidewall 104b and tube sidewall 114b, which enables a hook 216 to pass through; and thereby detachably attach line 200 to tubes 112a, 112b. In one embodiment, aperture 120b in cylinder 102b and tube 112b are in alignment, so as to enable passage of hook 216. In some embodiments, aperture 120b may form a generally circular shape.

In some embodiments, two pair of caps 134a-d comprise open ends 124a-d, and closed ends 126a-d, which detachably attach to first ends 106a, 106b and second ends 108a, 108b of the pair of cylinders 102a, 102b and tubes 112a, 112b. In one exemplary use, a first cap 134a and an opposite second cap 134b fasten to tube 112a, and a third cap 134c and an opposite fourth cap 134d fasten to tube 112b, may attach to two different tubes.

In exemplary use, caps 134a-d, are defined by inner cap surfaces 110a-d, accessible from open ends 124a-d. Each cap is sufficiently deep to snugly receive the first ends 106a, 106b and second ends 108a, 108b of the cylinders 102a, 102b and tubes 112a, 112b. In some embodiments, open ends 124a-d, of caps 134a-d may have a diameter of about 0.3" to 1.1" and a depth of about 0.2" to 0.8". Caps 134a-d may be attached to open ends 124a-d, closed ends 126a-d of cylinders 102a, 102b and tubes 112a, 112b by use of an adhesive. Suitable materials for caps 134a-d may include, without limitation, a plastic, a metal, aluminum, brass, copper, steel or other type of composite material.

In one embodiment, caps 134a-d include at least one substantially flat surface region 128a-d having depressions 130a-d, that house magnets 132a-d. Magnets 132a and magnet 132b are housed in cap 134a and cap 134b such that they are magnetically attracted to magnet 132c and magnet 132d housed in cap 134c and cap 134d, respectively. The at least one flat surface region 128a-d is sufficiently wide, such as about 0.1" to 0.5". The at least one flat surface region 128a-d enables caps 134a-d to remain stationary on a flat or slightly sloped surface. During the process of fastening caps 134a-d to open ends 124a-d, closed ends 126a-d of cylinders 102a, 102b and tubes 112a, 112b, at least one flat surface region 128a-d, on caps 134a-d may be oriented parallel to each other so that assembly 100 can remain stationary on a surface, without rolling.

In some embodiments assembly 100 may also include at least one illumination button 122a in cap 134a which engages a light emitting diode (LED) 123a that emits light from cap 134b to enable hands free illumination, while knotting or splicing line 200. In this manner, light emanating from cap 134b may be visible when depressing illumination button 122a which completes an electrical circuit. In one embodiment, a lens, a power switch, an electrical circuit, and a battery may be used for operation of illumination, as is known in the art.

Figure 3:
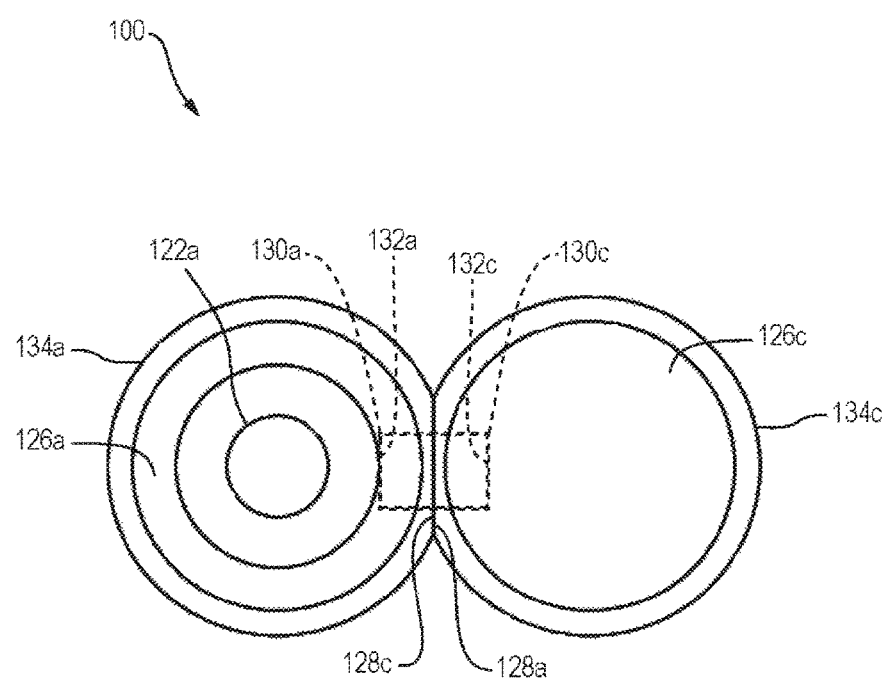
FIG. 3 illustrates a top plan view of an exemplary pair of tubes magnetically attached at caps, showing a cap with at least one flat surface area used to house a magnet, in accordance with an embodiment of the present invention.

Looking now at FIG. 3, assembly 100 is a top plan view with cap 134a magnetically attracted to cap 134c. Caps 134a, 134c are magnetically attracted through use of at least one magnet 132a, 132c to detachably attach for efficient stowage when not in use. Caps 134a, 134c include at least one flat surface region 128a, 128c defined by depressions 130a, 130c. Flat surface regions 128a, 128c restrict rolling by tubes 112a, 112b.

Figure 4:
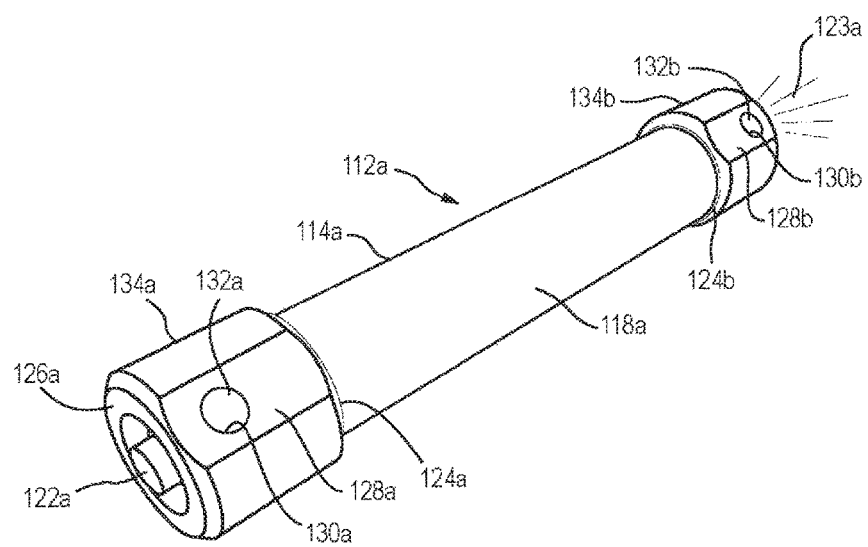
FIG. 4 illustrates a perspective view of one exemplary assembly piece used for knotting and splicing a line, in accordance with an embodiment of the present invention.

As shown in FIG. 4, an exemplary view of assembly tube 112a, used for knotting and splicing a line 200. Cap 134a and an opposite cap 134b fasten to tube 112a. In one embodiment, tube sidewall 114a includes external surface 118a, configured with material to inhibit slippage and enhance gripping by hand. Magnets 132a, 132b are integrated into flat surface regions 128a, 128b of caps 134a, 134b, having depressions 130a, 130b that are sufficiently wide and deep to house magnets (FIG. 1). Depressions 130a, 130b may have dimensions of about 0.1" to 0.4" in diameter and 0.1" to 0.5" in depth. At least one illumination button 122a engages a light emitting diode (LED) 123a emanating light while in use.

Figure 5A:
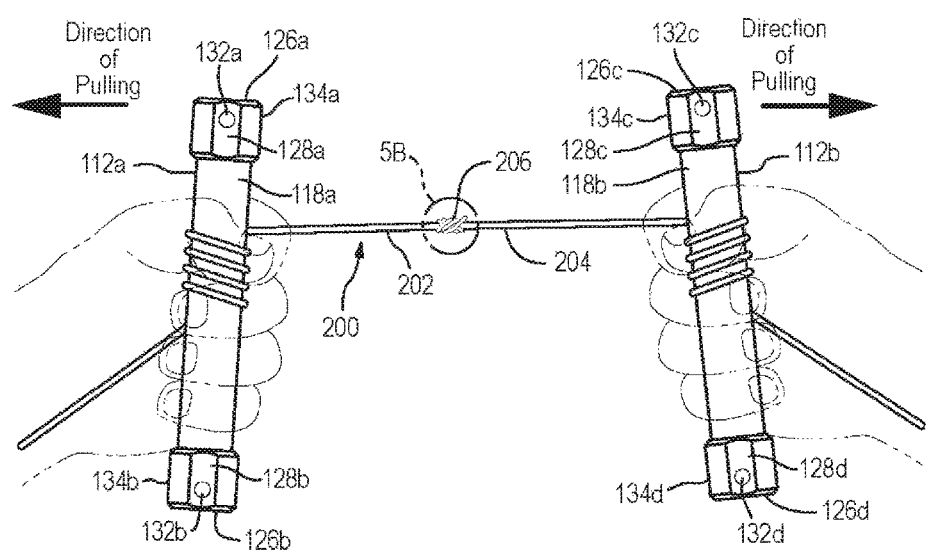
FIG. 5A illustrates a perspective view of a line forming a knotted pattern between a pair of tubes, where the pair of tubes is listed as Model Type A in FIG. 11, in accordance with an embodiment of the present invention.

Turning now to FIG. 5A, assembly 100 may further include line 200 that is defined by left strand 202 and right strand 204. Line 200 may include a fishing line, known in the art. Line 200 may be constructed of monofilament, fluorocarbon, ultra-high molecular weight polyethylene or a variety of other materials.

The pair of tubes 112a, 112b work to hold, manipulate, stretch, and enable formation of knotted patterns and splices in line 200. In one embodiment, left strand 202 and right strand 204 of line 200 wrap around the pair of tubes 112a, 112b. External surfaces 118a, 118b of tubes 112a, 112b are constructed of a material that inhibits slippage of the line 200 and resists the line 200 from cutting into the external surfaces 118a, 118b. However, in other embodiment, (FIG. 8) left and right strands 202, 204 may also be attached to a pair of clamps 210a, 210b. In any case, in FIG. 5A, the line 200 is held loosely to form a knotted pattern, and subsequently pulled in opposite directions to form the knot 206.

Figure 5B:
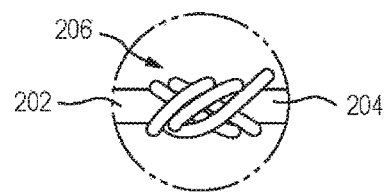
FIG. 5B illustrates an enlarged view of a knotted pattern formed, in accordance with an embodiment of the present invention.

As shown in FIG. 5A, the hands grip tubes 112a, 112b and pull in opposite directions until knot 206 forms as detailed in FIG. 5B. Since left strand 202 and right strand 204 are wrapped around the tubes 112a, 112b, the force exerted on the line 200 when pulling the tubes 112a, 112b in opposite directions is directed against the external surfaces 118a, 118b, and not directly against the hand. This reduces the risk of personal injury that would otherwise occur if the line 200 was wrapped around one's hand instead of the tubes 112a, 112b and their external surfaces 118a, 118b. In addition, since greater pulling force can be exerted on the tubes 112a, 112b and their external surfaces 118a, 118b than would otherwise be safe, or possible, if using one's hands, the knot 206 can be tightened with greater force resulting in a fully cinched knot 206 having the greatest strength possible.

Figure 6:
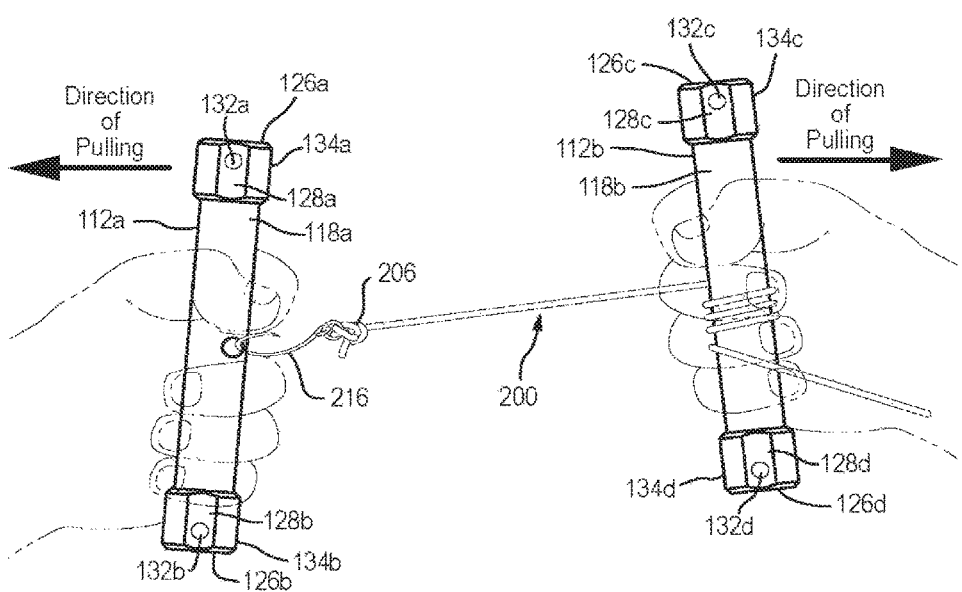
FIG. 6 illustrates a perspective view of a line with one end attached to a hook that is inserted through an aperture of one tube, and the remaining line wrapped around a second tube, where the pair of tubes is listed as Model Type C in FIG. 11, in accordance with an embodiment of the present invention.

FIG. 6 illustrates a perspective view of line 200 attached to hook 216 and wrapped around tube 112b. As an additional attachment point for line 200, cylinder 102a and tube 112a is defined by one aperture 120a. Aperture 120a is positioned to enable hook 216 to pass through for wrapping line 200 to the external surface 118b of tube 112b. In this manner, line 200 can be detachably attached to tubes 112a, 112b while line 200 is being held, manipulated, stretched, and pulled in opposite directions by tubes 112a, 112b.

Tubes 112a, 112b are pulled in opposite directions so that knot 206 can be tightened. As line 200 is wrapped around tube 112b, its external surface 118b, which is constructed of a material that provides friction to prevent line 200 from slipping and at the same time resists the line 200 from cutting through it, ensures that the force exerted on line 200 is directed against the external surface 118b and not against the hand. This reduces the risk of personal injury that would otherwise occur if the line 200 was wrapped around the hand. In addition, since greater pulling force can be exerted on the tubes 112a, 112b and their external surfaces 118a, 118b than would otherwise be safe, or possible, if using one's hands, the knot 206 can be tightened with greater force resulting in a fully cinched knot 206 having the greatest strength possible.

Figure 7:
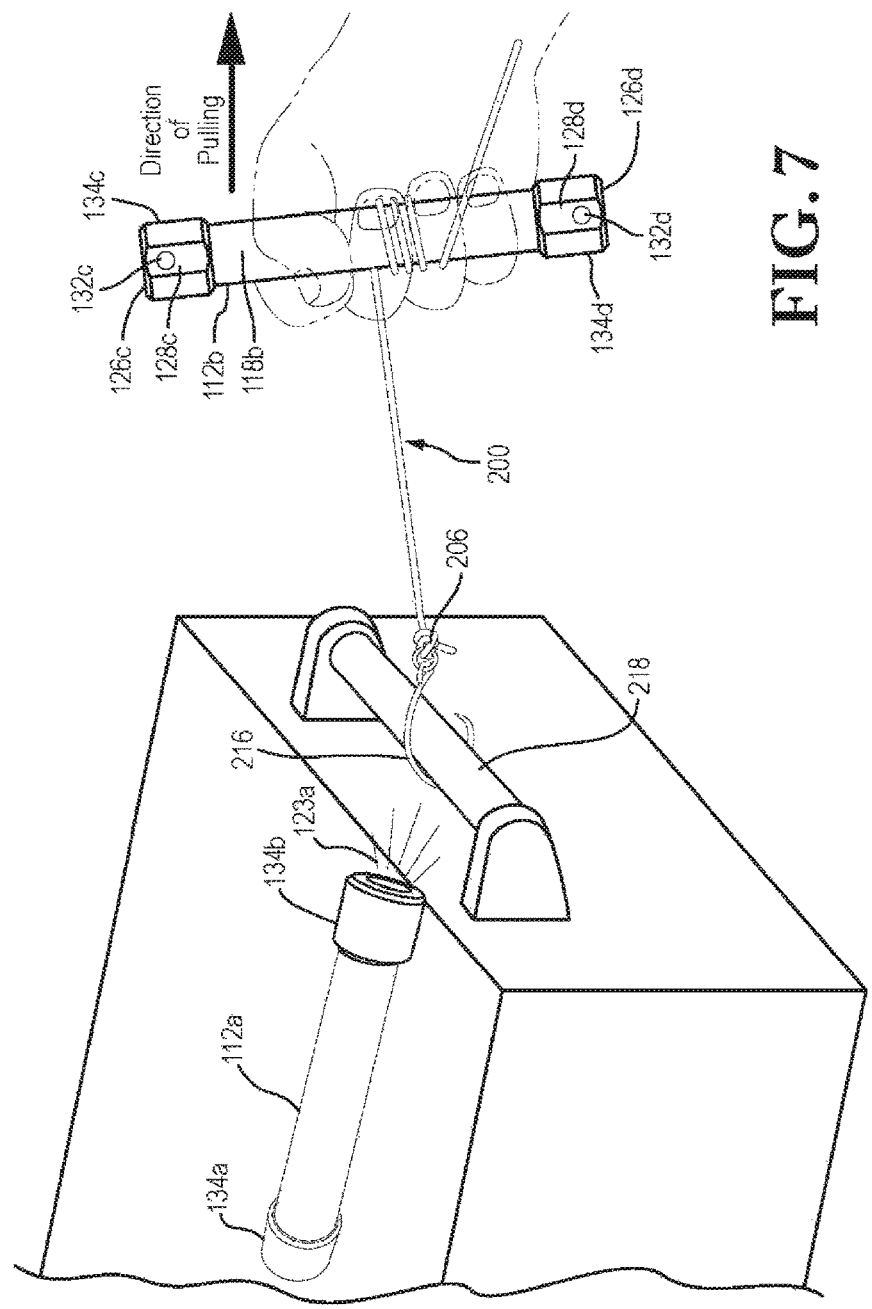
FIG. 7 illustrates a perspective view of a line that, at one end, is attached to a hook that is detachably attached to a mounting surface illuminated by one tube having an LED, and at the other end is wrapped around a second tube, where the pair of tubes is listed as Model Type B in FIG. 11, in accordance with an embodiment of the present invention.

FIG. 7 illustrates a perspective view of line 200 attached to hook 216. Hook 216 fastens to mounting surface 218 for detachable attachment. Line 200 wraps around tube 112b. A knot 206, of any useful type in line 200, is made to hook 216 or other type of terminal tackle that is held in place by a mounting surface 218 or other such suitable attachment point.

As shown in FIG. 7, cap 134b emits light by means of a light emitting diode (LED) 123a to enable hands free illumination towards the hook 216 and knot 206. Tube 112a may lay on a flat surface such that light shines directly on hook 216 and knot 206 under dark or low light conditions. In this manner, a user can have a clear view during the process of forming the knotted pattern and tightening knot 206 or splice 208. After knot 206 has been tied, and before it has been tightened, line 200 used to make knot 206 is wrapped around tube 112b. Tube 112b is gripped firmly and pulled away from knot 206 to tighten knot 206 or splice 208.

Tube 112b is pulled from left to right, while mounting surface 218 remains stationary, so that knot 206 can be tightened. As line 200 is wrapped around tube 112b, its external surface 118b, which is constructed of a material that provides friction to prevent line 200 from slipping and at the same time resists the line 200 from cutting through it, ensures that the force exerted on line 200 is directed against the external surface 118b and not against the hand. This reduces the risk of personal injury that would otherwise occur if the line 200 was wrapped around the hand. In addition, since greater pulling force can be exerted on the tube 112b and its external surface, 118b than would otherwise be safe, or possible, if using one's hands, the knot 206 can be tightened with greater force resulting in a fully cinched knot 206 having the greatest strength possible.

Figure 8:
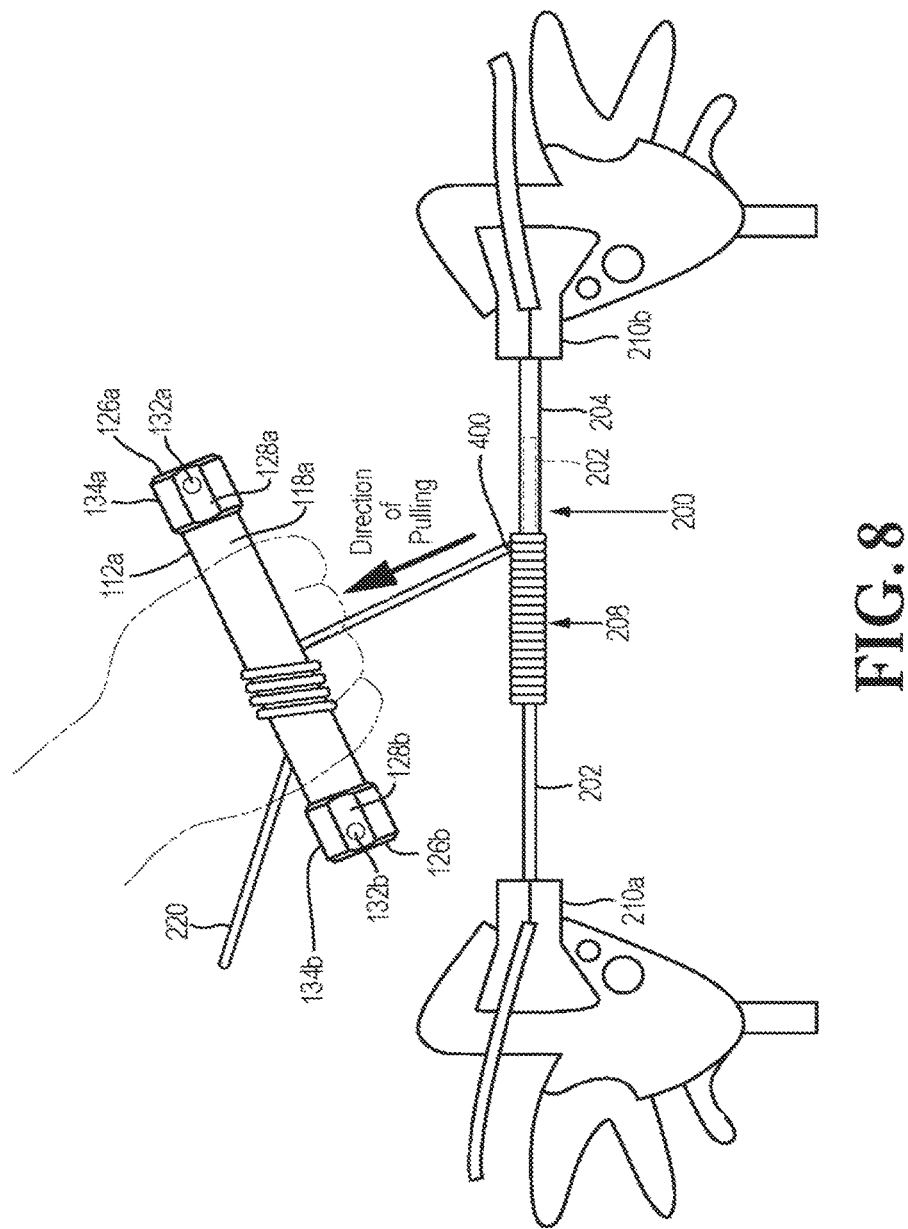
FIG. 8 illustrates a line extended between a pair of clamps and a tube pulling the line to form a splice, and securing the line tightly over a second line, where the second line is partially inside the first line, in accordance with an embodiment of the present invention.

FIG. 8 illustrates a line 200 extended between a pair of clamps 210a, 210b and a tube 112a wrapping around the second line 220 to form a splice 208, and securing the second line 220 tightly over the line 200, where the left strand 202 is partially inside the right strand 204. As illustrated, a splice 208 connection is formed with a left strand 202 of line 200, typically made of solid monofilament or fluorocarbon, which is fed inside a right strand 204 of line 200, typically made of woven ultra-high molecular weight polyethylene. The right strand 204 of line 200 has its fibers loosened so that the inside diameter becomes accessible for the left strand 202 to pass inside. The left strand 202 of line 200 and right strand 204 of line 200 are secured at their ends by a pair of clamps 210a, 210b.

A second line 220, often referred to as a splice securing line, is tightly wrapped around right strand 204 of line 200. Next, second line 220 wraps around tube 112a and is held taut by pulling forces from the hand. With left strand 202 and right strand 204 held firmly in place by clamps 210a, 210b, tube 112a is pulled in a direction that is approximately perpendicular to left strand 202 and right strand 204. The motion of pulling secures the second line 220 to the right strand 204 by means of a knot (not shown) that is formed under the wrappings of second line 220. Since second line 220 is wrapped around tube 112a, the pulling force exerted on the second line 220 is directed against external surface 118a of tube 112a and not directly against the hand.

Right strand 204 is held tightly over left strand 202, which is inside of it. The forces of friction that exists between the left strand 202, right strand 204, and second line 220 ensure that the left strand 202 and right strand 204 are secure and will not disengage. Finally, the second line 220 is cut away close to the left strand 202 and right strand 204 at cut away point 400.

As second line 220 is wrapped around tube 112a, its external surface 118a, which is constructed of a material that provides friction to prevent second line 220 from slipping and at the same time resists the second line 220 from cutting through it, ensures that the force exerted on second line 220 is directed against the external surface 118a of tube 112a and not against the hand. This reduces the risk of personal injury that would otherwise occur if the second line 220 was wrapped around the hand.

Figure 9:
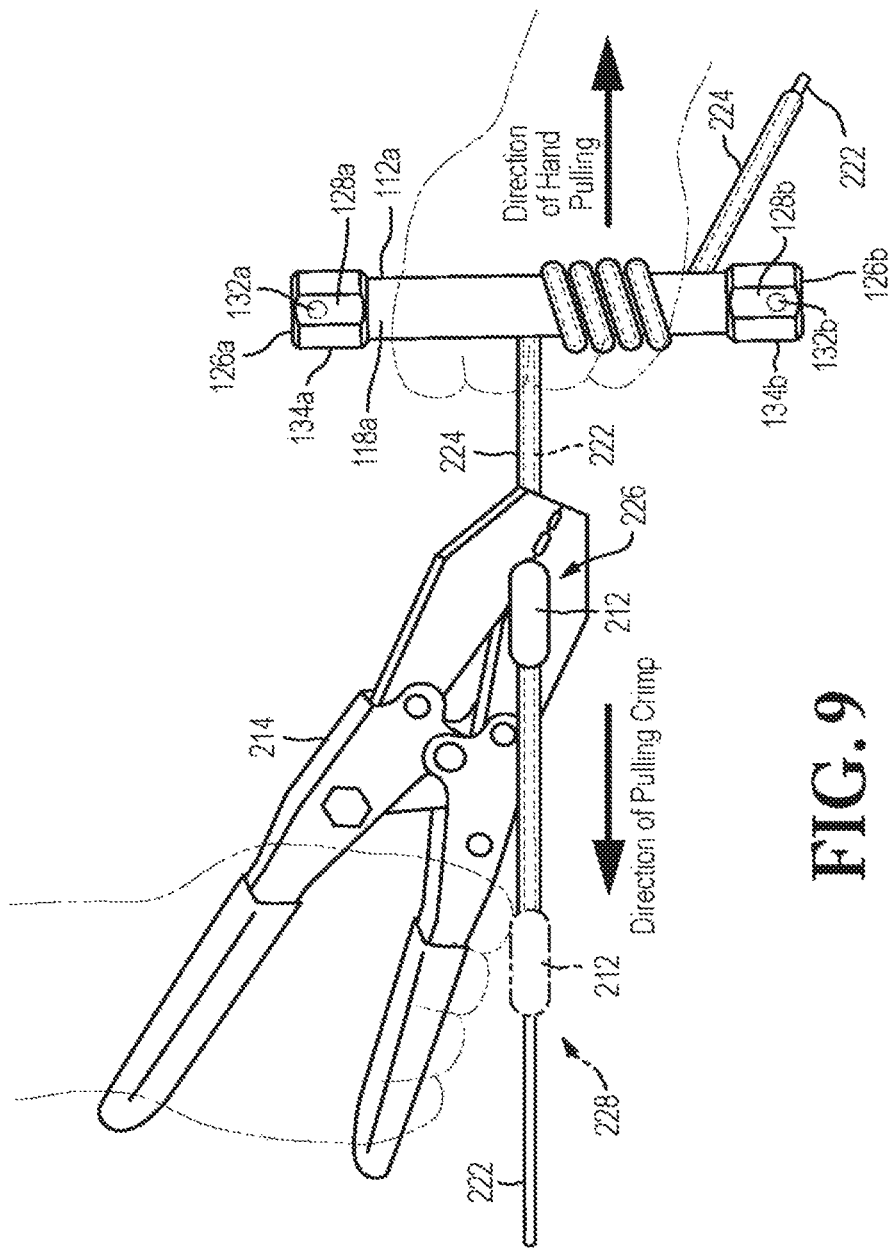
FIG. 9 illustrates a perspective view of a tube pulling a line in the opposite direction in which a crimping tool pulls a crimp down the line before forming at least one crimp in the line, in accordance with an embodiment of the present invention.

FIG. 9 illustrates a perspective view of tube 112a stretching, to the right, a solid line 222, typically made of monofilament or fluorocarbon, that has been inserted into a relaxed hollow line 224, typically made of woven ultra-high molecular weight polyethylene, while a crimp tool 214 pulls at least one crimp 212, over relaxed hollow line 224 from right, at the starting position 226, to the left, at the ending position 228. Relaxed hollow line 224 has its woven fibers loosened so that its inner diameter becomes accessible for the solid line 222 to pass inside. In FIG. 9, a crimp 212 is crushed at the ending position 228 where solid line 222 enters relaxed hollow line 224, using crimp tool 214, In some embodiments, at least one crimp 212, may slide down and over the relaxed hollow line 224, starting at the starting position 226 and ending at the ending position 228. A crimp tool 214 is placed in front of crimp 212, at the starting position 226 while the compressed hollow line 224 is wrapped around the external surface 118a of tube 112a. Next, one hand is placed over tube 112a and held in place while the other hand grasps the crimp tool 214 and pulls crimp 212 down line 224 from right to left, terminating at the ending position 228. As this is done, relaxed hollow line 224 is compressed by crimp 212 and its woven fibers are forced together again yielding a compressed hollow line 224 over solid line 222.

As tube 112a is pulled from left to right, the compressed hollow line 224 that is wrapped around tube 112a and its external surface 118a, which is constructed of a material that provides friction to prevent line 200 from slipping and at the same time resists the line from cutting through it, ensures that the force exerted on the compressed hollow line 224 is directed against the external surface 118a and not against the hand. This reduces the risk of personal injury that would otherwise occur if the compressed hollow line 224 was wrapped around the hand.

Figure 10:
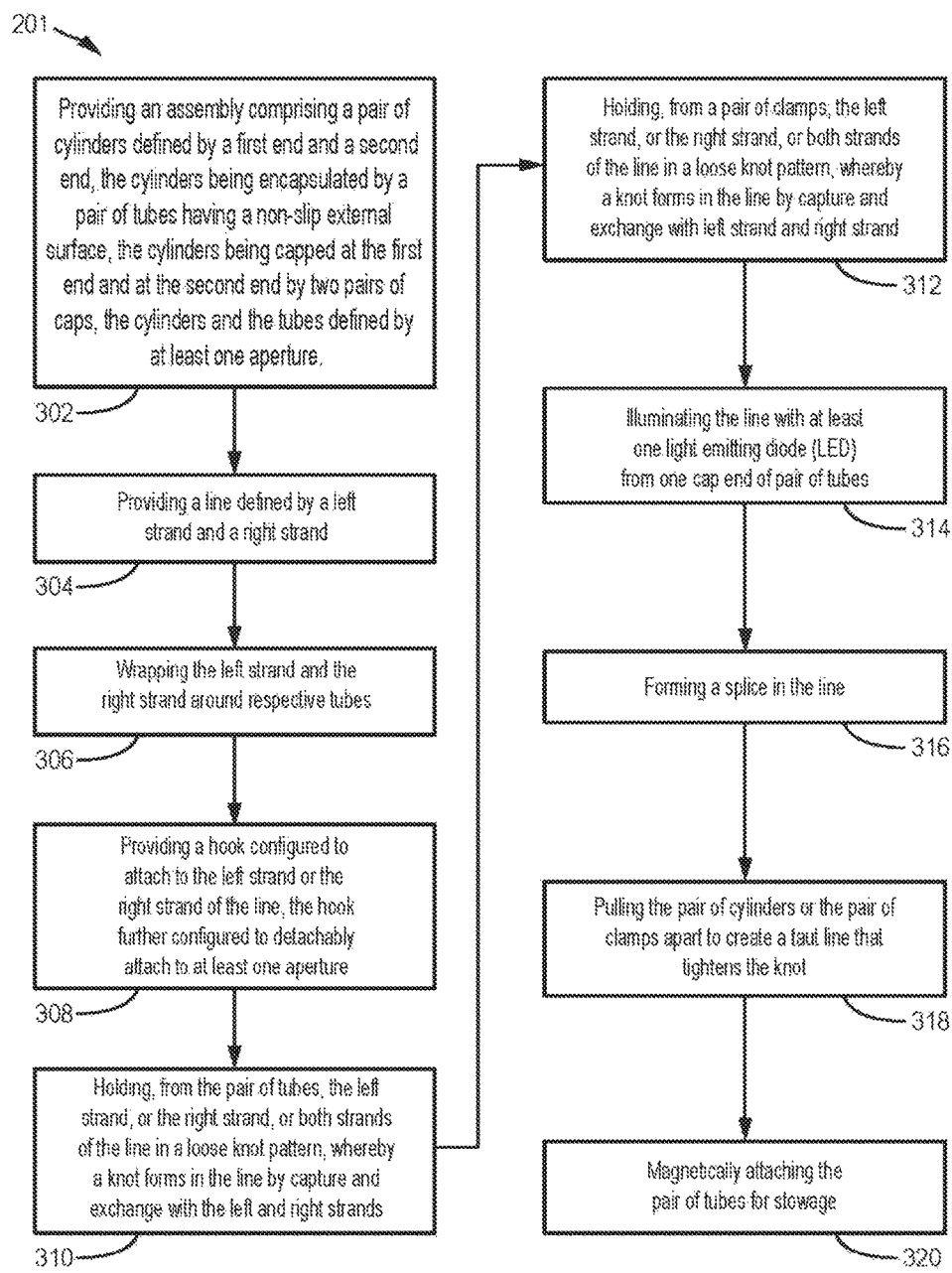
FIG. 10 illustrates a flowchart diagram of an exemplary method for knotting and splicing a line, in accordance with an embodiment of the present invention.

FIG. 10 illustrates a flowchart diagram of an exemplary method 201 for knotting and splicing line 200. Method 201 may include an initial Step 302 of providing an assembly 100, the assembly 100 comprising a pair of cylinders 102a, 102b defined by a first end 106 and a second end 108, the pair of cylinders 102a, 102b being encapsulated by a pair of tubes 112a, 112b having a non-slip external surface 118a, 118b, the pair of cylinders 102a, 102b further being capped at the first end 106 and the second end 108 by two pair of caps 134a-d, the pair of cylinders 102a, 102b and the pair of tubes 112a, 112b being defined by at least one aperture 120a.

In some embodiments, method 201 may further comprise a Step 304 of providing a line 200 defined by a left strand 202 and a right strand 204. A Step 306 includes wrapping the left strand 202 and the right strand 204 around respective tubes 112a, 112b. A Step 308 comprises providing a hook 216, the hook 216 configured to attach to the left strand 202 or the right strand 204 of the line 200, the hook 216 further configured to detachably attach to at least one aperture 120a, 120b.

In some embodiments, a Step 310 may include holding, from pair of tubes 112a, 112b, the left strand 202, or the right strand 204, or both strands of the line 200 in a loose knot 206 pattern, whereby a knotted pattern forms in the line 200 by capture and exchange with the left strand 202 and the right strand 204.

A further Step 312 may include holding, from a pair of clamps 210a, 210b, the left strand 202, or the right strand 204, or both strands of the line 200 in a loose knotted pattern, whereby a knot 206 forms in the line 200 by capture and exchange with the left strand 202 and the right strand 204.

In some embodiments of the method 201, a Step 314 may include illuminating the line 200 with at least one illumination button 122a integrated into cap 134a. A Step 316 includes forming a splice 208 in the line 200. Another Step 318 may include pulling the pair of tubes 112a, 112b in opposite directions to create a taut line 200 that tightens the knot 206. A final Step 320 comprises magnetically attaching the pair of tubes 112a, 112b for stowage, such as when the assembly 100 is not operable. At least one magnet 132a-d in depressions 130a-d in caps 134a-d may be used for this purpose.

FIG. 11 depicts a Table 136 of exemplary cap configurations. As Table 136 depicts, these various caps have possible aspects for each rod/cylinder, including: being plain; having an aperture in the middle; having a flat end; having a hole at the end for passage of light from an LED. For example, Type A has a first cylinder that is plain with a flat end, and a second cylinder that is plain with a flat end. Type B has a first cylinder that is plain with a flat end, and a second cylinder that is plain with a hole at the end for passage of light from an LED. Though any combinations of the above may be utilized in the present disclosure.

Looking now at FIG. 12, Table 138 illustrates experimental breaking strength analysis of eight 3-turn Seaguar knots formed with 30 lb Izorline XXX Monofilament and 30 lb Seaguar Blue Label Fluorocarbon using the assembly versus bare hands to cinch the knot.

Ideally, the assembly 100 relieves the hands from the pain normally experienced when cinching down on knots, especially with using braided or SPECTRA® lines. Further, the assembly 100 allows the user to pull with greater force when cinching knots, potentially allowing for a more fully-formed, complete, and ideal knot. This is particularly true as the strength of the line used to make the knots increases. For knots that are tied with 20 to 40 pound break strength rated line, the assembly 100 may result in some knot connections being stronger than they would otherwise be if tied by hand. But, as the break strength of the line used to make knots increases to 50 to 130 pounds, an ever greater number of different types of knots that are tied with the assembly 100 would be expected have a higher breaking strength than the same knots tied with bare hands.

The reason why use of the assembly 100 would be expected to result in some knots breaking at higher forces than the same knots tied with bare hands is because a user can more comfortably and safely exert a greater force when cinching a knot because the pulling force exerted on the line is directed against external surfaces 118a, 118b of the assembly 100 instead of directly against one's bare hands. Consequently, a knot tied with the assembly 100 are more likely to be fully-formed, complete, ideal and stronger than the same type of knot tied with bare hands. This theory was tested using the assembly 100.

Looking again at Table 138 in FIG. 12, a series of experiments used 30 lb Izorline XXX monofilament line and 30 lb Seaguar Blue Label Fluorocarbon line. The two lines were connected using a 3-turn Seaguar knot. The method of cinching the Seaguar knot is illustrated in FIG. 5A. Four Seaguar knots were cinched using the assembly 100, as shown in FIG. 5A, and another four Seaguar knots were cinched using bare hands. The breaking strength of the eight knots was tested on a jig that pulled on the knots until they broke, at which point the breaking force was recorded.

The results are summarized in Table 138 in FIG. 12. A first trial 140 shows the Seaguar knot tied with the assembly 100 broke at 33.6 pounds of force compared to 24.8 pounds for the Seaguar knot tied with bare hands. A second trial 142 shows the Seaguar knot tied with the assembly 100 broke at 30.1 pounds of force compared to 28.5 pounds for the Seaguar knot tied with bare hands. A third trial 144 shows the Seaguar knot tied with the assembly 100 broke at 29.9 pounds of force compared to 27.0 pounds for the Seaguar knot tied with bare hand. A fourth trial 146 shows the Seaguar knot tied with the assembly 100 broke at 29.5 pounds of forces compared to 25.0 pounds of forces for the Seaguar knot tied with bare hands.

The resultant average teaches that the assembly 100 resulted in a Seaguar knot that was 4.5 pounds stronger on average than the same Seaguar knot tied with bare hands. Using a student's t-test assuming unequal variances, the 4.5 pound difference in the average values was statistically significant at a 95% confidence level (alpha=0.05) because the p-value of 0.014 was less than 0.05 (alpha).

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An assembly for knotting and splicing a line, the assembly comprising:
    a pair of cylinders defined by a first end, a second end, and a cylinder sidewall;
    a pair of tubes defined by a tube sidewall that forms an external surface and an elongated tube cavity, the pair of tubes disposed to at least partially encapsulate the pair of cylinders, the external surface of the pair of tubes are comprised of a material having a shore hardness of between 40 A and 70 A, thereby inhibiting slippage;
    two pair of caps comprising an open end and a closed end, the two pair of caps detachably attachable to the first end and the second end of the pair of cylinders and the pair of tubes;
    on a first tube of the pair, at least one magnet oriented north to south detachably attached to the at least one cap,
    on a second tube of the pair, at least one magnet oriented south to north detachably attached to at least one cap, thereby enabling magnetic attraction between the pair of tubes;
    whereby the pair of tubes are separable to allow the pair of tubes to manipulate independently of each other during knotting or splicing operations;
    whereby the two pair of caps magnetically engage each other during stowage.

2. The assembly of claim 1, wherein the cylinder sidewall and the tube sidewall form at least one aperture.

3. The assembly of claim 1, wherein at least one illumination button is disposed to join with the at least one cap, wherein the at least one illumination button engages at least one light emitting diode for selectively emitting light in the at least one cap.

4. The assembly of claim 1, where in the cylinder sidewall and tube sidewall form at least one aperture and wherein at least one illumination button is disposed to join with the at least one cap, wherein the at least one illumination button engages at least one light emitting diode for selectively emitting light in the at least one cap.

5. The assembly of claim 1, wherein the external surface of the pair of tubes comprises at least one layer of a polymer material.

6. The assembly of claim 2, wherein the at least one aperture is defined by a generally round shape.

7. The assembly of claim 1, wherein the two pair of caps integrate a light emitting diode.

8. The assembly of claim 1, wherein the two pair of caps comprise an inner cap surface receiving the first end and the second end of the pair of cylinders and the pair of tubes.

9. The assembly of claim 1, wherein the two pair of caps are defined by at least one flat surface region, the at least one flat surface region defined by a depression.

10. The assembly of claim 1, further comprising at least one magnet housed in a depression of the two pair of caps.

11. The assembly of claim 1, further comprising a line defined by a left strand and a right strand.

12. The assembly of claim 9, wherein each strand of the line wraps around a respective tube.

13. The assembly of claim 10, wherein each strand of the line detachably attaches to a pair of clamps.

14. The assembly of claim 11, further comprising a crimp tool forming a crimp in the line.

15. The assembly of claim 12, further comprising a hook detachably attachable to at least one aperture, wherein the cylinder sidewall and the tube sidewall form the at least one aperture, the hook joined with a left strand or a right strand of the line.

16. The assembly of claim 13, wherein the line comprises a splice.

17. The assembly of claim 14, further comprising a mounting surface, wherein the left strand of the line joins with the mounting surface and the right strand of the line joins with one of the cylinders.

18. The assembly of claim 15, wherein the line is a fishing line.

19. An assembly for knotting and splicing a line, the assembly consisting of:
    a pair of elongated, hollow or solid cylinders defined by a first end, a second end, and a cylinder sidewall;
    a pair of elongated, hollow tubes defined by a tube sidewall that forms an external surface and an elongated tube cavity, the pair of tubes disposed to at least partially encapsulate the pair of cylinders, the external surface of the pair of tubes are comprised of a material having a shore hardness of between 40 A and 70 A, thereby inhibiting slippage, the external surface of the pair of tubes comprising at least one layer of a polymer material;
    at least one aperture formed in the cylinder sidewall and the tube sidewall;
    two pair of caps comprising an open end and a closed end, the two pair of caps detachably attachable to the first end and the second end of the pair of cylinders and the pair of tubes, the two pair of caps comprising an inner cap surface receiving the first end and the second end of the pair of cylinders and the pair of tubes, the two pair of caps defined by at least one flat surface region, the at least one flat surface region defined by a depression;
    at least one illumination button disposed to join with the two pair of caps for engaging at least one light emitting diode, the at least one light emitting diode selectively emitting light from the two pair of caps; and
    on a first tube, at least one magnet oriented north to south housed in at least one depression of the two pair of caps,
    on a second tube, at least one magnet oriented south to north housed in at least one depression of the two pair of caps, thereby enabling magnetic attraction between the pair of tubes;

wherein the pair of tubes are separable to allow the pair of tubes to manipulate independently of each other during knotting or splicing operations;

whereby the two pair of caps magnetically engage each other during stowage.

20. The assembly of claim 17, wherein the assembly comprises a line defined by a left strand and a right strand, each strand of the line wrapping around a respective tube.

21. The assembly of claim 20, further comprising a hook detachably attachable to the at least one aperture, the hook joined with the left strand or the right strand of the line.

22. A method for knotting and splicing a line with an assembly, the method comprising:

providing an assembly, the assembly comprising a pair of cylinders defined by a first end and a second end, the pair of cylinders being encapsulated by a pair of tubes having a non-slip external surface comprised of a material having a shore hardness of between 40 A and 70 A, the pair of cylinders and tubes further being capped at the first and second ends by two pair of caps, the pair of cylinders and the pair of tubes being defined by at least one aperture;

providing a line defined by a left strand and a right strand;

wrapping the left strand and the right strand around respective tubes;

providing a hook, the hook attaching to the left strand or the right strand of the line, the hook further detachably attachable to the at least one aperture;

holding, from the pair of tubes, the left strand, or the right strand, or both strands of the line in a loose knot pattern, whereby a knot forms in the line by capture and exchange with the left strand and the right strand;

holding, from a pair of clamps, the left strand, or the right strand, or both strands of the line in a loose knot pattern, whereby a knot forms in the line by capture and exchange with the left strand and the right strand;

illuminating the line with at least one light emitting diode integrated into one cap per tube;

forming a splice in the line;

pulling the pair of tubes in opposite directions to create a taut line that tightens the knot; and magnetically attaching the pair of tubes for stowage.

* * * * *